Nov. 3, 1970   J. W. WARNER, JR   3,537,721

WHEEL AND SUPPORT FRAME STRUCTURE

Filed Nov. 25, 1968                                   2 Sheets-Sheet 1

Inventor
John W. Warner, Jr.
By Hibben, Noyes & Bicknell
Attorneys

Nov. 3, 1970  J. W. WARNER, JR  3,537,721
WHEEL AND SUPPORT FRAME STRUCTURE
Filed Nov. 25, 1968 2 Sheets-Sheet 2
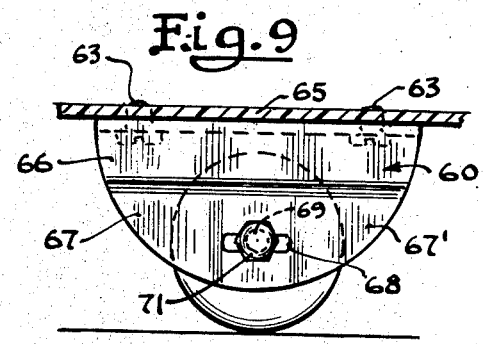
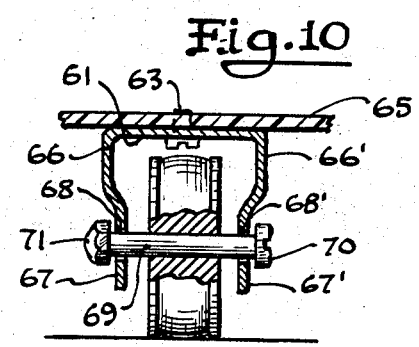
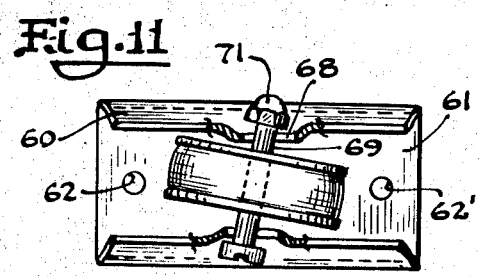
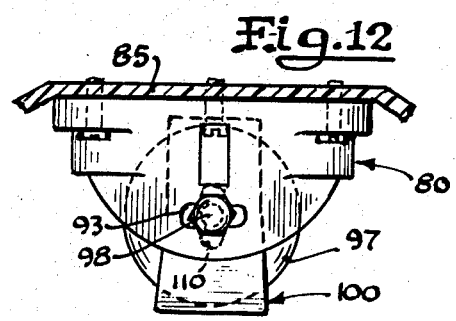
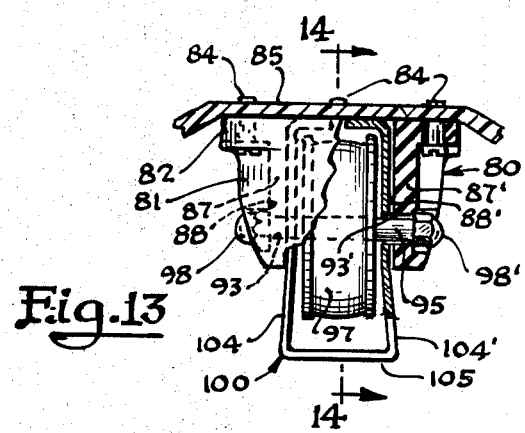
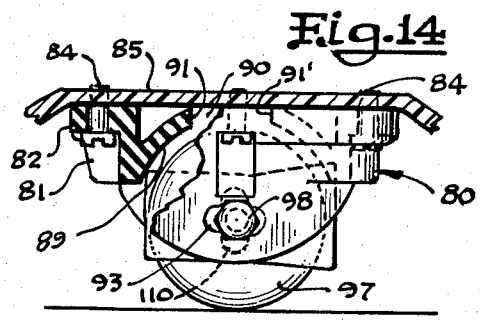
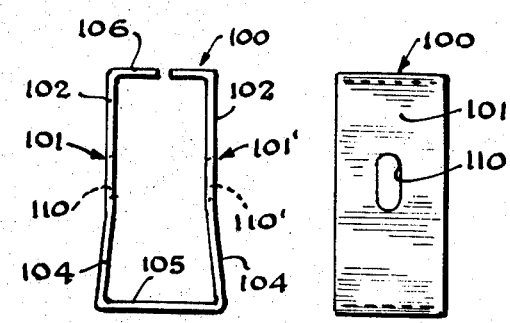
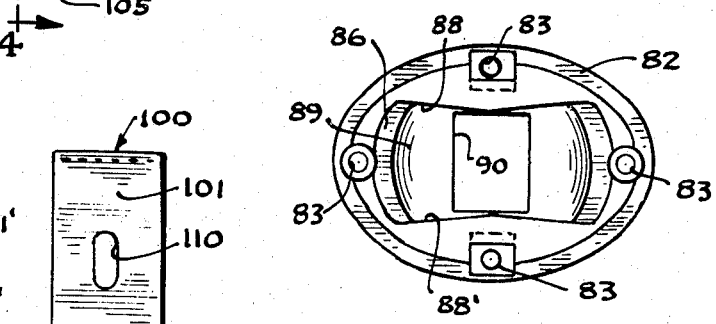
Inventor
John W. Warner, Jr.
By Hibben, Noyes & Bicknell
Attorneys United States Patent Office 3,537,721
Patented Nov. 3, 1970

3,537,721
WHEEL AND SUPPORT FRAME STRUCTURE
John W. Warner, Jr., Waukegan, Ill., assignor to Hideaway Handles, Inc., Waukegan, Ill., a corporation of Illinois
Filed Nov. 25, 1968, Ser. No. 778,690
Int. Cl. B62b 3/00
U.S. Cl. 280—47.17                5 Claims

ABSTRACT OF THE DISCLOSURE

A directional wheel and supporting wheel frame structure for use with a movable case to facilitate rolling the case along a variable direction course in which the axle of the wheel is supported in an elongated longitudinally extended slot formed in a wheel yoke and wherein a wheel frame is pivotally and slidably mounted on the wheel axle to form a locking engagement with said wheel yoke when the wheel frame is in a vertical wheel supporting position.

---

The present invention relates generally to a wheel structure and to a support frame for a wheel, and more particularly to an improved directional wheel and to a wheel frame structure adjustable to support and prevent movement of the wheel.

When it is desired to roll a body supported by one or more wheels along a surface for a considerable distance, use of caster wheels does not permit the operator to readily control the direction of movement of the body, as there is a marked tendency for caster wheels to turn to one side or the other from a longitudinal path wherever there is any irregularity in the surface over which the body is being rolled. Thus, when moving a suitcase or a display case along a sidewalk or like surface it has been found preferable to use a fixed directional wheel having a rigid support for the wheel axle as opposed to a caster type wheel or ball bearing type support.

However, a conventional fixed directional wheel has the disadvantage of not permitting the case to be maneuvered or steered readily and, since it is important to provide means for readily guiding a suitcase or a display case to avoid obstacles, in addition to permitting guiding the case along a directional course for a considerable distance, an improved wheel structure is desirable.

When providing a suitcase or display case with wheels for rolling the case along a supporting surface, it is also important to provide the wheel with support means to prevent movement of the wheel and case when desired, so that the suitcase when placed in a particular position will remain in the set position.

It is therefore an object of the present invention to provide a case or like structure with an improved wheel which will permit guiding the structure along a substantially straight course while at the same time permitting turning the case to avoid an obstacle and adjusting the direction of the straight course while in transit.

It is a further object of the present invention to provide an improved wheel structure which has both fixed directional and steerable properties.

It is still another object of the present invention to provide an improved wheel frame structure for preventing movement of a wheel and a structure supported thereby.

Other objects of the invention will be apparent to those skilled in the art in the following detailed description and claims when read in conjunction with the accompanied drawing wherein:

FIG. 9 is a side elevational view of a modified form of a wheel structure of the present invention;

FIG. 10 is an end elevational view partially in vertical section of the wheel structure of FIG. 9;

FIG. 11 is a bottom view of the wheel structure of FIG. 9 in a different operative position;

FIG. 12 is a side elevational view of still another modified form of the wheel structure of the present invention;

FIG. 13 is an end elevational view partially in vertical section of the wheel structure of FIG. 12;

FIG. 14 is a vertical sectional view taken along the line 14—14 of FIG. 13;

FIG. 15 is a bottom view of the wheel structure of FIG. 12 partially disassembled.

FIG. 16 is an end elevational view of the wheel frame element of FIGS 12–15; and FIG. 17 is a side elevational view of the wheel frame element of FIGS. 12–15.

Figure 2:
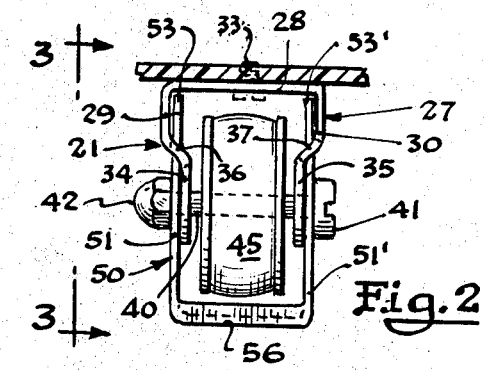
FIG. 2 is a front end elevational view taken along the line 2—2 of FIG. 1.
Figure 1:
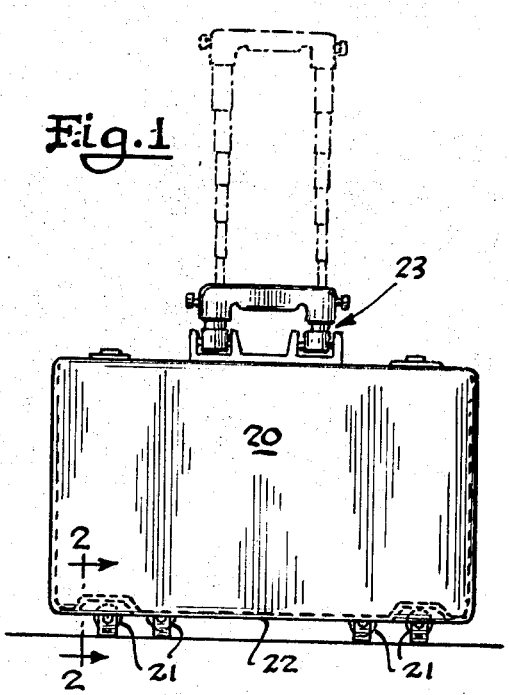
FIG. 1 is a side elevational view of a case having operatively mounted thereon the improved wheel structure and associated wheel frame structure of the present invention.

In FIG. 1 of the drawing the case 20, such as a suitcase having a molded plastic body, is provided preferably with a pair of spaced supporting wheel housing structures 21 preferably mounted in spaced molded recesses formed at each end in the lower surface 22 of the case 20. The case 20 also preferably has an adjustable extendable handle structure 23 mounted on the upper surface thereof which facilitates rolling the case along a surface without requiring the user to bend down in order to hold the handle of the case 20. Each of the wheel structures 21 also preferably has associated therewith a wheel frame 50 which is adapted to support the wheel structure and case 20 when the wheel frame 50 is moved into the vertical position, as shown in FIGS. 1, 2, 3 and 4 of the drawing.

The wheel housing structure 21 comprises a unitary generally U-shaped wheel yoke member 27 having a transverse plane upper surafce 28 with spaced depending lateral sections 29, 30 extending generally perpendicularly outwardly from the opposite lateral edges of the upper surface 28. The transversely extending upper surface 28 is provided with spaced openings 31, 32 through which fasteners 33 extend to securely hold the yoke member 27 in a fixed position on the lower surface 22 of the case 20. The lower portions 34, 35 are inset with respect to the lateral sections 29, 30 and are connected thereto by a short generally transversely extending wall portion 36, 37. The lower portions 34, 35 are provided at about their midpoint with oppositely disposed elongated openings or passages 38, 38' which have their major axes extending longitudinally and generally parallel with the longitudinal axes of the wheel yoke 27. The elongated openings 38, 38' each have a length which is greater than the width thereof to permit the opposite ends of a wheel axle 40 mounted therein to move longitudinally within the opening to a limited extent. The axle 40 which is mounted in the openings 38, 38' has a diameter slightly smaller than the minor dimension of the openings 38, 38' to permit the axle 40 to be freely rotatable therein. One end of the axle 40 is enlarged to form a retaining head 41 and the opposite end has a fastener 42 mounted thereon to hold the axle 40 in the openings 38, 38'. The head 41 and the fastener 42 are spaced somewhat greater than the outer walls of the lower portions 34, 35 to permit limited transverse movement of the axle 40 within the elongated slot-like openings 38, 38', as when one end of the axle 40 moves longitudinally while the other remains substantially fixed.

Figure 7:
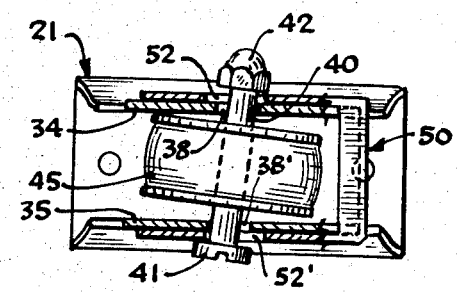
FIG. 7 is a bottom view of the wheel assembly of FIG. 6 in a different operative position.

A wheel 45 of any conventional design is mounted on the axle 40 midway between the ends thereof with the outer edges of the wheel 45 spaced from the inner surfaces of the lower portions 34, 35. The elongated openings 38, 38' have a length substantially in excess of the diameter of the axle 40 so that the axle 40 can be moved to a position such that the axle 40 is no longer perpendicular to the plane of the longitudinal axes of the wheel housing structure 21, as best shown in FIG. 7 of the drawing. In the preferred embodiment the wheel 45 can be moved about 10° on either side of the plane of the longitudinal axes of the wheel structure 21 when lateral pressure is applied to the handle of the case 20 while the case 20 is being rolled over a supporting surface, thereby substantially improving directional maneuverability of the case 20 without making it difficult to move the case 20 along a straight course when desired.

Figure 3:
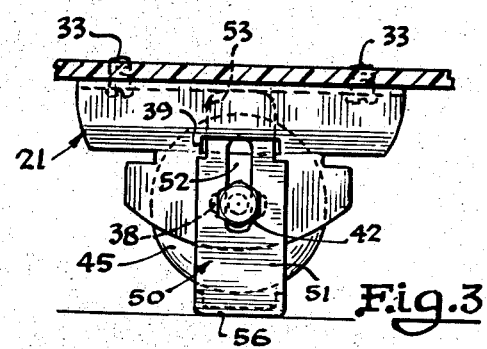
FIG. 3 is a side elevational view taken along the line 3—3 of FIG. 2.
Figure 4:
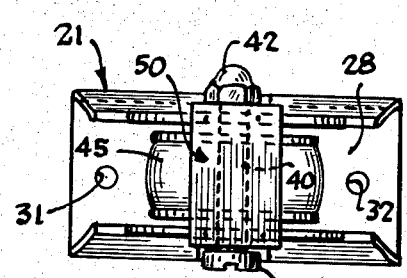
FIG. 4 is a bottom view of the wheel structure of FIG. 2.

A wheel frame 50 having a generally U-shaped configuration is pivotally mounted in the axle 40 with the inner surface of the arm portions 51, 51' of the frame member 50 in resilient sliding contact with the outer surface of the depending lower portions 34, 35. The arm portions 51, 51' have oppositely disposed elongated slot-like openings 52, 52' rounded at both ends and extending longitudinally of said frame 50 with a width slightly greater than the diameter of the axle 40 and a length several times greater than the diameter of the axle 40. The frame 50 is thus adapted for being moved both transversely and pivotally relative to said axle 40. The end sections 53, 53' of the arm portions 51, 51' have a generally rectangular configuration with a width preferably less than the width of the arm portions 51, 51' and slightly less than the length of the openings 39, 39' in the transversely extending wall portions 36, 37 of the wheel yoke member 27. The length of the reduced diameter end sections 53, 53' and the length of the slot-like openings 52, 52' are coordinated such that when frame 50 is moved to a vertical position with the upper ends of the sections 53, 53' contacting the transverse surface 28 of the wheel structure 21, the lower end of the slot-like openings 52, 52' will be on contact with the axle 40, as best shown in FIG. 3, of the drawing and the transverse base section 56 is spaced slightly from the wheel 45. When the end sections 53, 53' are inserted through the openings 39, 39', respectively, with the transversely extending base section 56 in contact with the supporting surface, the wheel frame 50 is locked in a substantially vertical position and will hold the wheel 45 out of contact with the supporting surface to prevent movement of the wheel and the case 20 supported thereby.

Figures 5, 6:
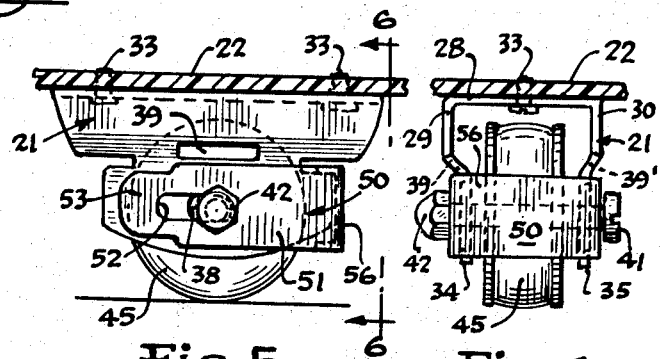
FIG. 5 is a side elevational view of the wheel structure of FIG. 2 with the associated wheel frame in an elevated position.
FIG. 6 is an end elevational view taken along the line 6—6 of FIG. 5.

When it is desired to move the wheel frame 50 out of its load supporting operative position, the end sections 53, 53' are withdrawn from the openings 39, 39' and pivotally moved 90° about the axle 40 into an inoperative elevated position. The wheel frame 50 is retained in an elevated position by frictional contact with the lower portions 34, 35 of the yoke 27, as best shown in FIGS. 5 and 6 of the drawing.

In the modified form of the invention shown in FIGS. 9-11, a unitary wheel yoke 60 is formed from a generally circular sheet metal blank and is comprised of a transversely extending upper section 61 having spaced openings 62, 62' extending therethrough for receiving fastener elements 63, 63' which securely hold the yoke 60 in a fixed position on the lower surface 65 of a case or other suitable structure. Depending arm sections 66, 66' extend downwardly from the outer lateral edges of the upper section 61 generally perpendicular to the transverse upper section 61. The lower arm portions 67, 67' are inset with respect to the upper section 66, 66'. The lower arm portions 67, 67' have oppositely disposed elongated openings 68, 68' extending therethrough with the major axes thereof extending parallel to the longitudinal axes of the wheel yoke 60, as best shown in FIG. 9. An axle 69 is supported in the openings 68, 68' with the axle 69 having an enlarged head 70 formed on one end thereof and a fastener 71 secured to the opposite end thereof. The head 70 and the fastener 71 are spaced a distance somewhat greater than the outer surface of the lower portions 67, 67' of the yoke 60 to enable limited longitudinal movement of each end of the axle 69 within the openings 68, 68', as best shown in FIG. 11.

In the modified form of the invention shown in FIGS. 12-17, the wheel housing structure 80 comprises a molded semi-spherically shaped wheel housing body section 81 having a flat oval base 82 provided with passages 83 extending therethrough which are disposed at the opposite ends of the major and minor axes of the base 82 for receiving fastener elements 84 which securely hold the wheel housing structure 80 in a fixed position preferably in a molded concave depression formed in the lower surface 85 of a case. The lower surface of the wheel body section 81 provides a wheel yoke having spaced oppositely disposed lateral wall sections 87, 87' with spaced inner lateral wall surfaces 88, 88' extending substantially perpendicular to the plane of the upper surface of the base 82 and in inner concave upper wall surface 89. The lateral wall surfaces 88, 88' preferably diverge outwardly from the midpoint thereof, toward each end providing space for lateral turning movement of the wheel 97, as best shown in FIG. 15 of the drawing. The wheel housing body section 81 also has formed in the upper wall surface 89 a generally rectangular shape depression or passage 90 which is symmetrically disposed with respect to the vertical and longitudinal axes of the wheel housing structure 80. The sides 91, 91' of passage 90 are preferably perpendicular to the plane of the upper surface of the base 82.

The wall section of 87, 87' adjacent the lower edge thereof and on the vertical axis of the wheel structure 80 are provided with oppositely disposed openings 93, 93' extending transversely therethrough in which a wheel axle 95 is supported therein to permit limited longitudinal movement of each end thereof. The openings 93, 93' are elongated with their major axes extending longitudinally of the wheel housing structure 80 to provide for the longitudinal movement of the axle 95. A wheel 97 of any suitable design is mounted on the axle 95 at the midpoint thereof, and the axle 95 is held in the openings 93, 93' by suitable end retaining means 98, 98', which are spaced sufficiently to permit limited transverse movement of the axle 95 when one end of the axle 95 is moved longitudinally within one of the openings 93, 93'.

A unitary wheel frame 100 is pivotally and slidably mounted on axle pin 95 and is adapted for both reciprocal and pivotal movement relative to the axle pin 95. The wheel frame 100 is comprised of a unitary generally rectangular strip of material, preferably metal, bent into a generally open rectangular form having spaced lateral wall sections 101, 101' with the upper portions 102, 102' thereof extending parallel to the inner surfaces 88, 88' of the wall sections 87, 87' and having the lower portions 104, 104' thereof slanting outwardly with the lower edge thereof connected by a transversely extending support section 105. With the lower portion of the wheel frame 100 being wider than the remainder of the wheel frame 100, the wheel frame 100 provides a stable supporting means for the wheel and case structure.

The opposite ends of the strip of metal which forms the wheel frame 100 are bent inwardly to form the upper wall 106 of the wheel frame with the ends being spaced in order to permit the wall sections 101, 101' being sprung inwardly to provide a resilient engagement thereof with the inner surfaces 88, 88' of the wall sections 87, 87'.

An elongated passage 110 is formed in each of the wall sections 101, 101' of the frame 100 with the longer axes of the passages 110 extending parallel to the longitudinal axes of the wheel frame 100. The passages 110, 110' are sufficiently wide to permit the axle 95 being inserted therethrough without contacting the wheel frame 100.

As best shown in FIG. 13, when the upper end portion of the wheel frame 100 is inserted into the opening 90 of the body section 81 the wheel frame 100 is locked in a vertical weight-supporting position and prevents movement of the wheel and case structure. When it is desired to move the wheel frame 100 to an elevated inoperative position the frame 100 is moved downwardly to withdraw the upper end of the wheel frame 100 from the opening 90 and permit rotating the frame 100 ninety (90) degrees about the axle 95. The frame 100 is held in an elevated position out of contact with the supporting surface by the frictional engagement thereof with the inner surfaces of the lateral section 87, 87'.

Figure 8:
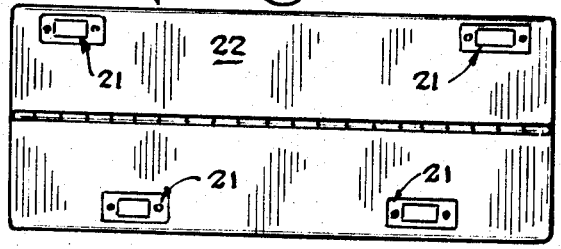
FIG. 8 is a bottom view of a case having the wheel structure of FIG. 2 mounted thereon in one operative arrangement.

It should be understood that whereas the embodiments shown in FIGS. 1 and 8 the drawing shows a case having two wheel structures with wheel frames on each end of the case, it is entirely feasible to have a pair of wheel structures at one end of the case and a single wheel structure at about the midpoint of the opposite end of the case. Also, the wheel frame structure of the present invention can be used on only one or all of the wheel structures.

I claim:

1. A wheel structure comprising; a wheel yoke having an upper surface adapted for mounting on a surface of a movable case in a fixed position, spaced depending lateral sections with oppositely disposed transverse openings for slidably supporting a wheel axle, said openings being elongated in the direction of the longitudinal axis of said wheel structure, a wheel axle supported adjacent the ends thereof by said sections in said openings with said axle movable longitudinally and transversely relative to said sections, a wheel mounted between said sections on said axle for contacting a supporting surface, and the ends of said axle each capable of limited longitudinal movement in opposite directions within said openings when lateral pressure is applied to said case while said case is being rolled on said wheel over a supporting surface; whereby said wheel can be turned laterally to either side of the longitudinal axis of said yoke.

2. A wheel structure as in claim 1, wherein said wheel yoke comprises a molded base section with depending wall sections thereof forming a concave recess having generally perpendicular inner lateral wall surfaces, and each of said wall surfaces having a said longitudinally extending transverse opening adapted to slidably support therein said wheel axle adapted for transverse and longitudinal movement.

3. A wheel structure as in claim 1, wherein said wheel is movable laterally to either side of the longitudinal axis of said wheel yoke forming an angle up to about 10° with said longitudinal axis of said wheel yoke.

4. A wheel structure as in claim 1, wherein said spaced depending lateral sections have the inner wall surfaces thereof diverging outwardly in each axial direction from said axle supporting transverse opening; whereby said walls are spaced a greater distance at the forward and rear edges thereof to provide additional space for lateral movement of said wheel when said wheel is turned to either side of the longitudinal axis of said yoke.

5. A movable case having in combination therewith a wheel structure for rolling the case over a supporting surface comprising; a case body having an extendable handle structure reciprocably mounted on said case to facilitate applying force to move said case and having on the lower surface of said case at least three spaced wheel structures having their longitudinal axis parallel to the longitudinal axis of said case, at least one of said wheel structures comprising a wheel yoke which is secured in a fixed position on said lower surface of said case, said yoke having spaced outwardly extending sections with oppositely disposed transverse openings therein for supporting a wheel axle, said openings being elongated in the direction of the longitudinal axis of said wheel structure, a wheel axle supported by said sections in said openings, a wheel mounted between said sections on said axle between the ends of said axle, and opposite ends of said axle capable of limited longitudinal movement in opposite directions within said openings when lateral pressure is applied to said case through said handle structure while said case is being rolled on said wheel over a supporting surface.

References Cited

UNITED STATES PATENTS

| | | | |
|---|---|---|---|
| 1,099,933 | 6/1914 | Pohrer | 280—47.17 |
| 1,839,396 | 1/1932 | Kimball | 16—18 |
| 2,533,403 | 12/1950 | Shultz | 16—18 |

LEO FRIAGLIA, Primary Examiner

R. R. SONG, Assistant Examiner

U.S. Cl. X.R.

16—18